United States Patent [19]

Wing

[11] Patent Number: 4,623,965
[45] Date of Patent: Nov. 18, 1986

[54] ELECTRONIC CHECKBOOK

[76] Inventor: Donald K. Wing, 7118 Treewater, Houston, Tex. 77072

[21] Appl. No.: 583,863

[22] Filed: Feb. 27, 1984

[51] Int. Cl.⁴ .............................................. G06F 15/30
[52] U.S. Cl. .................................. 364/408; 364/406; 364/705; 364/715
[58] Field of Search ............... 364/401, 404, 405, 406, 364/408, 705, 715; 235/3, 375, 379, 383

[56] References Cited

U.S. PATENT DOCUMENTS

| | | | |
|---|---|---|---|
| 4,053,735 | 10/1977 | Foudos | 364/401 X |
| 4,134,537 | 1/1979 | Glaser et al. | 235/379 |
| 4,222,109 | 9/1980 | Siwula | 364/408 X |
| 4,308,588 | 12/1981 | Siwula | 364/408 X |
| 4,403,301 | 9/1983 | Fessel | 364/406 X |
| 4,459,052 | 7/1984 | Lundblad | 235/379 X |
| 4,463,939 | 8/1984 | Watanabe | 235/379 X |
| 4,465,192 | 8/1984 | Ohba et al. | 235/379 X |
| 4,513,393 | 4/1985 | Edlund et al. | 364/408 X |

Primary Examiner—Gary V. Harkcom
Attorney, Agent, or Firm—Gunn, Lee & Jackson

[57] ABSTRACT

A portable, pocket sized check writing apparatus adapted to perform standard check writing functions incorporates a rectangular box-like housing open at one end for receiving a check cartridge. A keyboard is provided on the exterior of the housing for entry of data. A microprocessor is housed within the housing for receiving, storing and retrieving data. The microprocessor is operatively connected to liquid crystal display means for visually displaying data. A print head positionable relative to the face of a check is provided for printing entries on a check which is sequentially ejected from a stack of checks contained in the check cartridge.

15 Claims, 9 Drawing Figures

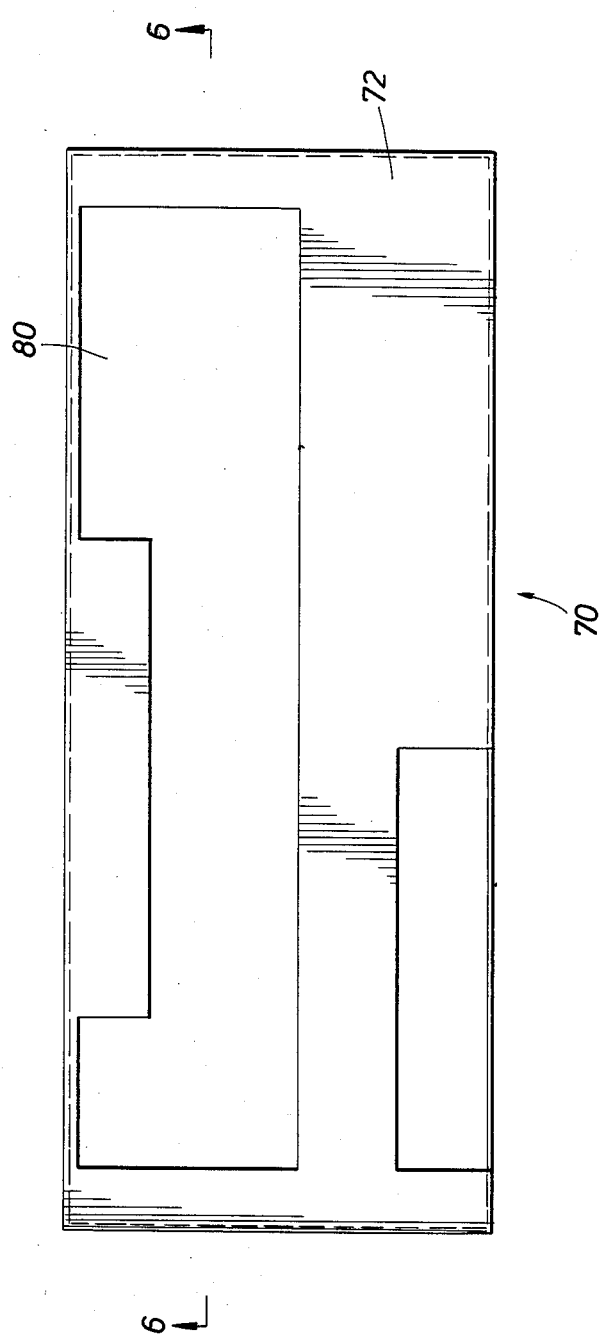
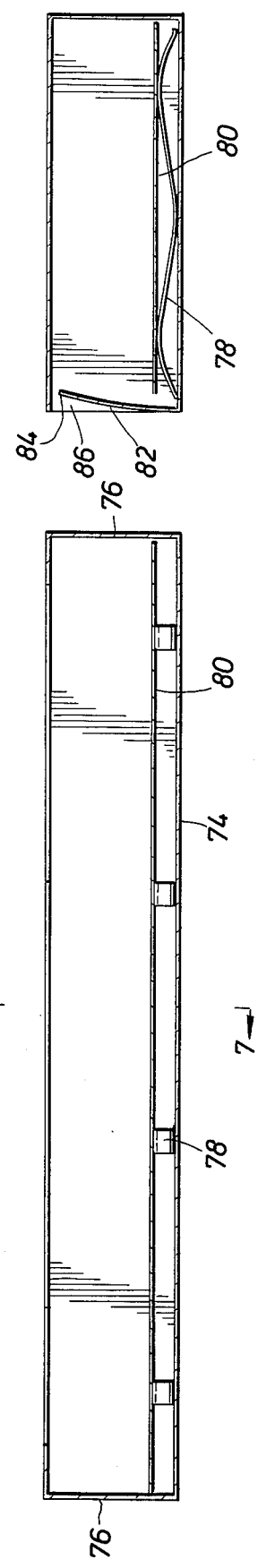

ELECTRONIC CHECKBOOK

BACKGROUND OF THE DISCLOSURE

This invention relates to check writing apparatus and more particularly to a computerized, pocket sized apparatus for maintaining, printing and recording deposits and withdrawals from a checking account.

A common problem encountered by many people is balancing a checkbook and reconciling the checkbook balance with the bank statement. Mathematical errors are easily made when balancing the checkbook, particularly when one is in a hurry. Often times, disbursed checks are not recorded in the check register, resulting in an inaccurate balance and perhaps overdrawing an account. These are just a few problems encountered daily by many check writers and which the apparatus of this application overcomes.

The primary function of the apparatus of the invention is to maintain, print and record deposits and withdrawals from a checking account. The user enters the name, amount and check memorandum. The apparatus of the invention prints the check, records the transaction in the register, updates the account balance and ejects the check for disbursement. Likewise, when making a deposit, the user simply enters the amount of the deposit and a deposit slip is printed.

Other features of the apparatus include the capability to void checks and deposits that have previously been recorded and make adjustments to the account. An automatic debit and credit feature updates the account periodically at the users request. An automatic check writing feature enables a user to enter checks for issuance at predetermined times of the month. When the date arrives, an indicator lights up informing the user that checks must be disbursed. The user then releases the checks and they are automatically printed, recorded and ejected for disbursement. Also included is a complete transaction inquiry system along with a bank reconciliation program.

Other features of the invention include its adaptability for use as a standard calculator and a date, time and alarm system which integrate with the check writing functions. The apparatus also includes a memo retention feature and recording of transaction files to a permanent file cassette.

SUMMARY OF THE INVENTION

The present invention is directed to a portable pocket sized check writing apparatus for printing, recording, and maintaining deposits and withdrawals from a checking account. The apparatus includes a microprocessor for receiving, storing and retrieving data. The microprocessor is operatively connected to a printing mechanism and a visual display. A plurality of checks are stacked within a check cartridge which is inserted in the apparatus. The face of the topmost check is positioned below the printing mechanism. The print mechanism is carried on shafts which position the print head relative to the face of the check for printing information thereon. The housing incorporates a keyboard for entry of data and an ejector mechanism sequentially ejects a single check from the check cartridge upon completion of the entry.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 is a sectional view of the check cartridge taken along line 6—6 in FIG. 8;

FIG. 7 is a sectional view of the check cartridge taken along line 7—7 in FIG. 6;

FIG. 8 is a top plan view of the check cartridge of the invention; and

DETAILED DESCRIPTION OF THE PREFERRED EMBODIMENT

Figure 1:
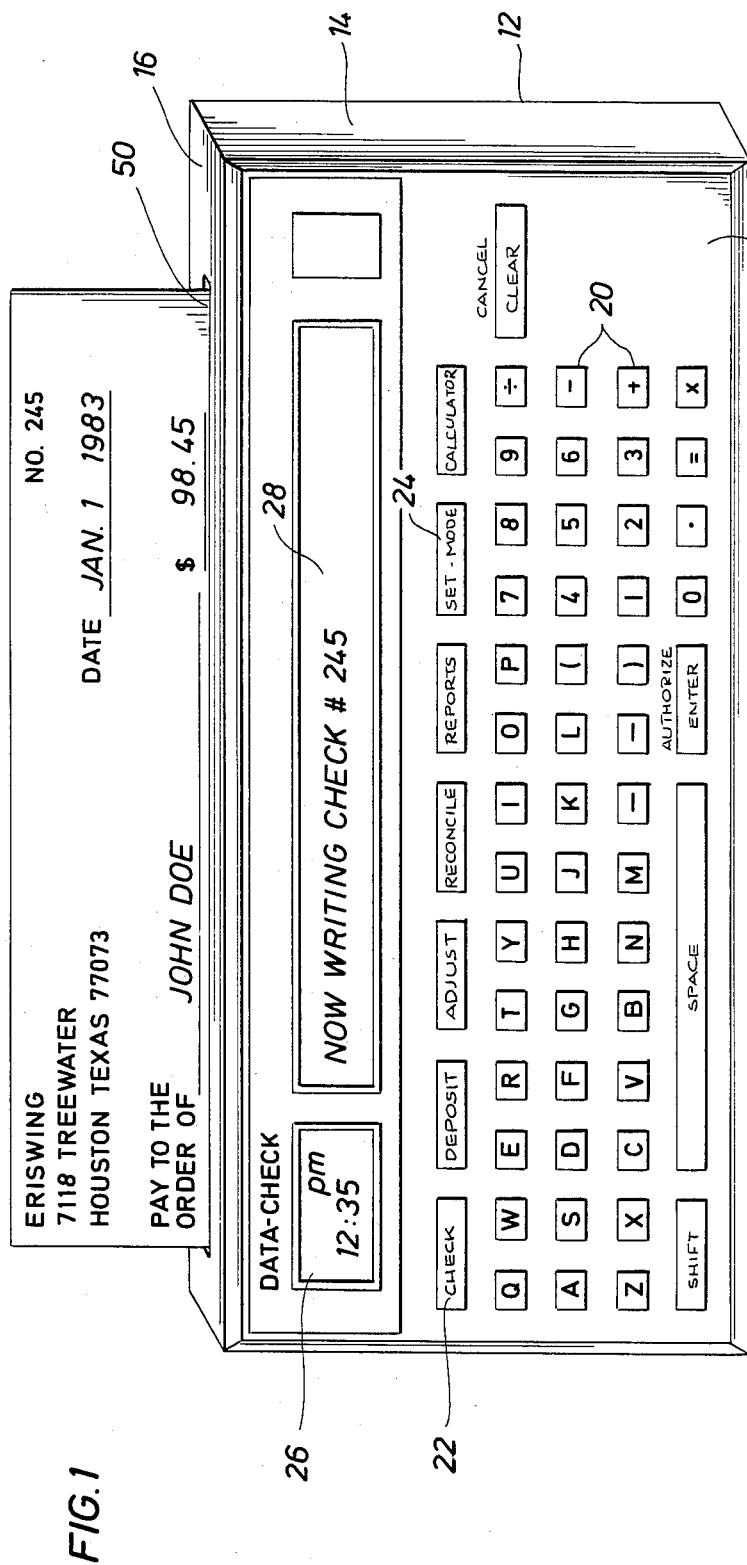
FIG. 1 is a perspective view of the apparatus of the invention.

Attention is first directed to FIG. 1 of the drawings where an apparatus 10 is illustrated in perspective. The apparatus 10 incorporates a substantially rectangular, box-like housing defined by a bottom 12, upstanding ends 14, a sloted plate 16 and a top cover 18. The rear end of the apparatus 10 is open to receive a check cartridge described in greater detail below.

The apparatus 10 is fabricated of light weight plastic material and may easily be held in the user's hand. The apparatus 10 is about the size of a conventional checkbook measuring approximately three inches in depth, six inches in width, and one-half inch in height. The apparatus 10 easily accommodates a check cartridge containing a stack of twenty-five checks of standard format, size and thickness.

The face plate 18 of the apparatus incorporates an alpha/numeric keyboard including function keys 20 for performing addition, subtraction, multiplication, and division. A row of transaction keys 22 permits the user to select a desired transaction. For illustrative purposes only, five transaction keys are shown in FIG. 1. Thus, a user may select to prepare a check, make a deposit, make an adjustment, reconcile the bank balance or prepare various reports. The apparatus 10 may be programmed or perform additional functions as required. A mode key 24 is provided for selecting the desired system of operation. The user may select one of three systems in the embodiment shown in FIG. 1. He may select the checking account system, calculator system or day, time and alarm system by depressing the appropriate keys. Keys are also provided so that a user may clear, shift, space and enter transactions.

The alarm system of the apparatus functions separately from the other systems. The time is displayed constantly on a separate display screen 26. However, the check accounting system interfaces with the date when recording transactions and writing checks. As shown in FIG. 1, the time is displayed in standard time with either a.m. or p.m. The alphabetical day of the week may also be displayed, as can the month, hours and seconds upon pressing appropriate function keys. The alarm system accommodates multiple settings. For example, the alarm may be set to sound at every hour or every half hour, as well as specific time settings.

The data display screen 28 displays entries for review and correction if necessary. Prompt messages are also displayed on the screen 28 for assisting a user through a particular transaction.

Figure 5:
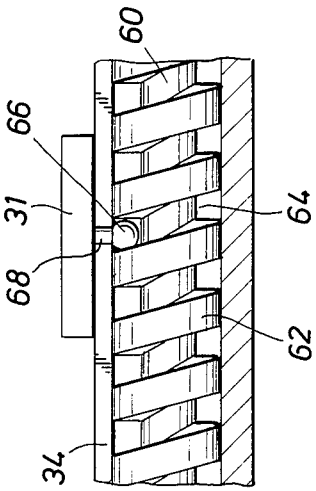
FIG. 5 is a partial sectional view of the drive mechanism for positioning the print head.
Figure 4:
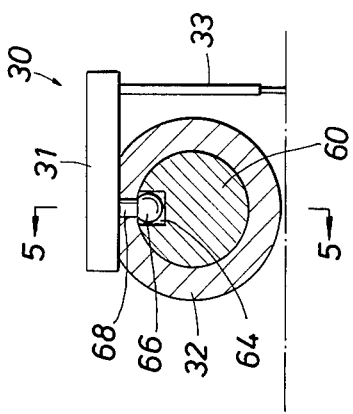
FIG. 4 is a side view of the print head of the invention.

Referring now to FIGS. 4 and 5, the print mechanism of the invention is shown. The print mechanism 30, shown in detail in FIG. 4, comprises an ink pad 31 and writing extension 33 carried on a shaft 32. It will be observed that the shaft 32 is a hollow tube incorporating a slot defined by oppositely facing longitudinal edges 34. The slot extends the full length of the shaft 32 providing a guide for the print mechanism 30.

The shaft 32 is supported above the plane of the check 38 on a pair of spaced and parallel shafts 40 and 42. The shafts 40 and 42 are positioned parallel to the edges of the check 38 and spaced a small distance therefrom so that the shaft 32 spans the face of the check 38. The shaft 40 is supported at one end thereof by the plate 16 and at the other end by an end member 44. Likewise, the shaft 42 is supported at one end thereof by the plate 16 and at the other end by drive motor 46. The shaft 40 is stationary and supported a fixed distance from the bottom 12. The shaft 42 is driven by the motor 46 for actuating the servo mechanism 36 to lift the writing extension 33 of the print mechanism 30 above the face of the check 38.

The servo mechanism 36 is slideably mounted on the shaft 42. The drive motor 34 travels along the shaft 40 and moves the shaft 32 relative to the face of the check 38. The print mechanism 30, which is carried on the shaft 32, is thus positioned at appropriate locations for printing the date, name and check amount on the face of the check 38.

Referring now to FIG. 5, the print head drive mechanism comprising threaded shaft 60 is shown. The shaft 60 is located within the hollow shaft 32 and operatively connected to the motor 34. The thread 62 on the shaft 60 forms a spiral groove 64 about the shaft 60 for receiving the head 66 of the print mechanism guide pin 68. The guide pin 68 is attached to the bottom of the ink pad 31 as best shown in FIGS. 4 and 5.

To operatively position the print mechanism 30, the guide pin 68 of the print head is snapped into the slot of the shaft 32 positioning the head 66 in the groove 64. Activation of the drive motor 34 revolves the shaft 60 and thereby moves the print mechanism 30 horizontally along the face of the check 38. The slotted shaft 32 carried at one end by the servo mechanism 36 remains rotationally stationary providing a guide for the guide pin 68. Activation of the servo mechanism 36 turns the shaft 32 one quarter turn, which in turn rotates or tilts the print mechanism 30 and lifts the writing extension 33 off of the surface of the check 38.

Figure 3:
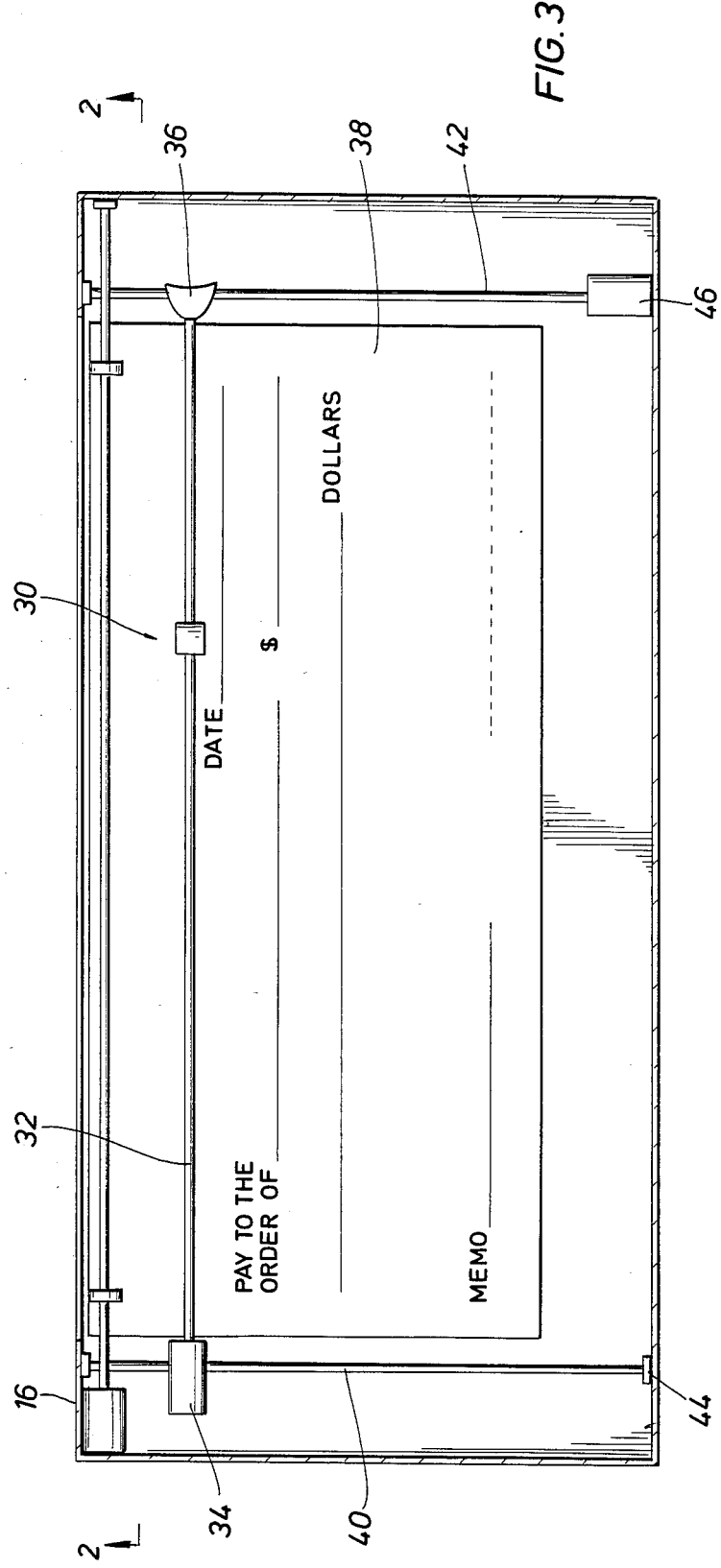
FIG. 3 is a sectional plan view of the apparatus of the invention.

Data is written on the face of the check 38 by manipulation of the print mechanism 30. As best observed by referring to FIG. 3, the print mechanism 30 moves from side to side and top to bottom relative to the face of the check 38. The print control circuit is operatively connected to the drive motors 34 which travels from top to bottom relative to the face of the check 38. The motor also turns the shaft 62, which in turn moves the print mechanism 30 side to side. Minute movements of the motor 34 along the shaft 40 and rotation of the shaft 62 manipulates the print mechanism 30 to form letters and/or numerals. The print mechanism 30 makes very short movements from side to side or top to bottom to form each letter and number of a transaction.

Upon completion of a transaction, the check is ejected through a slot 50 in the plate 16. The ejector mechanism shown in FIG. 2 includes a form advance motor 52 mounted within the housing of the apparatus 10 adjacent to the ejection slot 50. The motor 52 drives a shaft 54 supported at its distal end by the end number 14. A pair of pressure rollers 56 are carried on the shaft 54. The pressure rollers 56 engage the leading edge of the topmost check in the check cartridge 70. Upon activation of the form advance motor 52, the rollers 56 are rotated in a clockwise direction pulling the topmost check from the check cartridge 70 and through the ejection slot 50 in the plate 16. The check has the name, current date, amount, memorandum and check number printed thereon. The amount is printed numerically and alphabetically. The user need only sign the check prior to disbursement.

Turning now to FIGS. 6-8, the check cartridge 70 is shown in greater detail. The check cartridge 70 includes a top plate 72 and bottom 74 separated by upstanding end walls 76. A plurality of leaf springs 78 are positioned between the bottom 74 and a pressure plate 80. When the cartridge 70 is completely loaded with approximately twenty-five checks, the leaf springs 78 are compressed and provide an upward force to the plate 80 forcing the topmost check in the stack against the bottom surface of the top plate 72.

Figure 2:
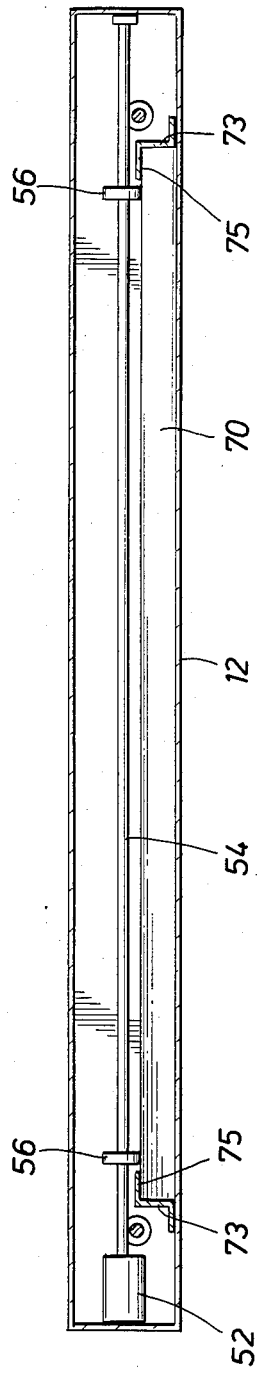
FIG. 2 is a sectional view of the apparatus of the invention taken along line 2—2 in FIG. 3.

A pair of forcing shoulders 73 are mounted to the bottom 12 of the apparatus 10 for operatively positioning the check cartridge 70 within the apparatus 10. The shoulders 73, as best shown in FIG. 2, are perpendicular to the bottom 12 and include inwardly extending flange members 75 which are spaced from and parallel to the bottom 12. The shoulder 73 and flange members 75 define a slot or channel-like cavity for receiving the check cartridge 70. The flange members 75 functionally engage the top plate 72 and hold the check cartridge within the apparatus 10.

It will be observed that the top plate 72 of the cartridge 70 is not solid. Portions of the top plate 72 are open exposing the surface of the check 38. Sufficient surface area of the check 38 is exposed for writing the check memorandum thereon. The face of the check 38 is pressed against the bottom of the plate 72 so that the exposed surface of the check 38 is flat, thereby presenting a flat writing surface for the print mechanism 30. An edge separator 82 located across the front end of the cartridge 70 separates the topmost check 38 from the stack of checks and positions the leading edge of the check 38 for engagement with the pressure rollers 56 of the ejection mechanism. The edge separator 82 curves inwardly from the bottom to the top thereof. The top edge 84 of the separator 82 does not contact the top plate 72. It is spaced from the plate 72 forming a lengthwise gap or slot 86 for advancement of the check 38 therethrough. As the topmost check 38 is pressed against the bottom of the plate 72, the leading edge of the check 38 is fanned into the slot 86 and contacts the ejection rollers 56.

Figure 9:
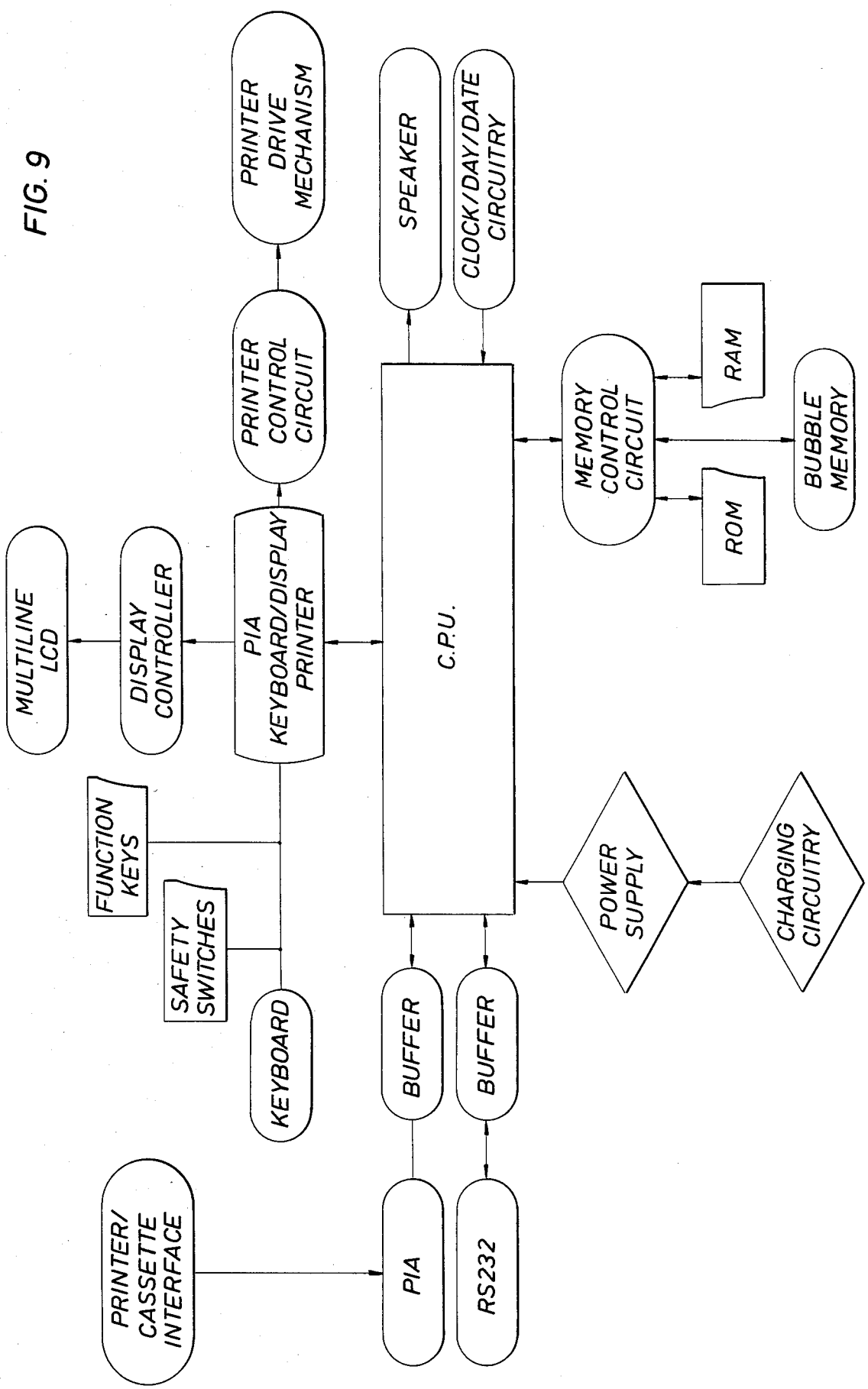
FIG. 9 is a flow chart and schematic diagram illustrating the apparatus of the invention.

In FIG. 9, a flow chart and schematic of the apparatus of the invention is shown. The CPU controls all the system operations of the apparatus. The CPU communicates with the memory systems through a memory control circuit. The ROM memory cell stores the control or system programs which are permanently fixed. The check register and transaction list are stored in the RAM memory cell and are updated with each entry. The CPU communicates with the keyboard, display screen and printer via a PIA circuit which transmits the appropriate signal to each element. A power supply and charging circuit are provided for operation of the CPU. Batteries provide the power source for normal operation of the apparatus, however, it may be recharged by plugging the recharger in a wall outlet as is typical with hand held calculators. Anciliary systems are also shown in FIG. 4. The clock/day/date circuitry communicates with the CPU and the output thereof is displayed in the multiline LCD. The apparatus is also provided with a standard RS 232 terminal for communication to a remote printer or for receipt of input data from another system. A buffer separates the RS 232 and CPU providing temporary memory storage.

The circuit components are mounted on mylar circuit boards which are not shown in the drawings. It is understood however, that mylar circuit, which are well known in the art, are illustrative of one means of mounting the circuit components within the apparatus 10. Other integrated circuit boards may also be used.

The foregoing is directed to the preferred embodiment of the present invention, other and further embodiments of the invention may be devised without departing from the basic concept thereof, and the scope thereof is determined by the claims which follow.

What is claimed is:

1. A portable, hand-held check writing apparatus comprising:
   (a) an external housing defined by a horizontally extending bottom, side walls extending vertically from said bottom and a horizontally extending top member secured to said side walls, said housing being open at one end and including a slot extending across one of said side walls opposite said open end of said housing;
   (b) keyboard means located on said top member for entry of alpha-numeric data;
   (c) computer means for receiving, storing and retrieving data;
   (d) print means for printing payee, check amount and memo information on the face of a check, said print means including a print head moveable horizontally and vertically relative to the face of the check;
   (e) a removable check cartridge removably operatively connected to said housing for storing a quantity of checks stacked one on the other;
   (f) drive means for moving said print head across the face of the check held stationary in said check cartridge for printing information thereon;
   (g) ejector means for sequentially ejecting a single check from the stack of checks through said slot in one of said side walls;
   (h) display means for visually displaying data; and
   (i) circuit means operatively connecting said computer means to said keyboard means, print means, drive means, ejector means and display means.

2. The apparatus of claim 1 wherein said print means comprises a print head moveably mounted on a first shaft above the face of a check and in writing contact therewith.

3. The apparatus of claim 2 wherein said first shaft is concentrically mounted within a hollow tube operatively connected at one end thereof to a servo mechanism.

4. The apparatus of claim 3 wherein said hollow tube incorporates a guide slot extending the axial length of said hollow tube providing a guide for said print head.

5. The apparatus of claim 3 wherein said first shaft is a threaded shaft having a convoluted thread forming a spiral groove about said first shaft.

6. The apparatus of claim 5 wherein said print head includes an ink pad and writing extention extending downwardly from said ink pad.

7. The apparatus of claim 6 wherein said print head further includes a lock pin having a ball-like head at the distal end thereof.

8. The apparatus of claim 7 wherein said spiral groove about said first shaft is sized to receive said lock pin head.

9. The apparatus of claim 1 wherein said drive means comprises a motor mounted on a second shaft for moving said first shaft relative to the face of a check.

10. The apparatus of claim 9 wherein said drive means further includes a servo mechanism carried on a third shaft for lifting said print means above the face of a check.

11. The apparatus of claim 1 wherein said display means includes a first screen for displaying day and time, and a second screen for displaying file data.

12. The apparatus of claim 1 wherein said ejector means comprises a pair of rollers mounted on a shaft operatively connected to a drive motor, said rollers being in contact with the leading edge of the top most check in said stack of checks and ejecting said check upon actuation of said drive motor.

13. The apparatus of claim 1 wherein said check cartridge includes a pressure plate urged upwardly by spring means toward a top plate, said stack of checks being stacked on said pressure plate, the topmost of said checks contacting said top plate.

14. The apparatus of claim 13 wherein said check cartridge further includes a check separator for separating a single check from said stack of checks.

15. The apparatus of claim 13 wherein said top plate is cut away exposing portions of the surface area of a check contacting the bottom side of said top plate enabling check memorandum to be printed on the check.

* * * * *